United States Patent [19]

Yeazel et al.

[11] Patent Number: 4,538,951
[45] Date of Patent: Sep. 3, 1985

[54] CHASSILESS VEHICLE AND FRONT REFUSE LOADER

[75] Inventors: Kenneth L. Yeazel, Tulsa; Robert J. Forester, Broken Arrow, both of Okla.

[73] Assignee: Crane Carrier Company, Tulsa, Okla.

[21] Appl. No.: 529,353

[22] Filed: Sep. 6, 1983

[51] Int. Cl.³ .............................................. B65F 3/04
[52] U.S. Cl. .................... 414/407; 292/111; 280/5 D; 280/716; 296/15; 296/56; 298/23 M; 414/408; 414/409; 414/513; 414/517
[58] Field of Search .............................. 414/405–409; 280/5 D, 786, 787; 296/15, 183, 203; 298/23 M; 292/111

[56] References Cited

U.S. PATENT DOCUMENTS

| | | | |
|---|---|---|---|
| 3,207,345 | 9/1965 | Ord | 414/406 |
| 4,325,560 | 4/1982 | Hirvonen | 296/15 X |
| 4,427,333 | 1/1984 | Ebeling | 414/409 |

Primary Examiner—Robert G. Sheridan
Attorney, Agent, or Firm—Head, Johnson & Stevenson

[57] ABSTRACT

A self-propelled wheeled vehicle has a load receiving tank with the driving wheeled suspension system and the driven steering control system directly attached to the load receiving tank. The prime mover and power transmission system is also attached to the tank and interconnected with the driving wheels. An operators cab is attached to the forward end of the load receiving tank. A front loader mechanism is integrated with a top front load receiving opening in the tank and the closure therefor such that movement of the closure simultaneously lifts an interconnected load container, raises same and dumps the load into the load receiving tank and vice-versa. The chassiless vehicle is applicable to rear loader and side loader use.

15 Claims, 15 Drawing Figures

CHASSILESS VEHICLE AND FRONT REFUSE LOADER

SUMMARY OF THE INVENTION

It is an object of this invention to provide a self-propelled wheeled load handling vehicle where the load receiving tank is integrated as the chassis of the vehicle and thus permits additional effective pay loads.

An additional object of this invention is to provide a cylindrical load receiving tank which includes a packer piston that is reciprocally movable inside the tank for movement from its normal front location to the rear of the tank. A telescopic cylinder is positioned outside and forward of the tank to permit additional effective pay load.

A further object of the invention is to provide a means for securing the packed load within the tank by a rear tailgate which, when pivoted open, allows the packer piston to force the load outward of the tank rear opening to dump and empty same.

It is a further object of the invention to provide increased compaction force of the packer piston.

A yet further object of the invention is to provide a front loading mechanism which includes means to integrate the opening and closing movement of a front top closure with the raising and dumping of the load from a pick-up load container.

The object of the invention is accomplished in its preferred embodiment by a self-propelled wheeled load handling vehicle especially adaptable for refuse which includes in its broadest form a longitudinal load receiving tank. The longitudinal axis of the tank is parallel to the forward rearward movement of the vehicle. A load receiving opening is located on the tank and includes therewith a closure. A packer piston is reciprocally movable inside the tank from its normal front position to the rear of the tank and vice-versa. The packer piston is movable by a telescopic hydraulic expansible cylinder which cylinder is supported and rested by a framework located forward of the tank. The location of the tank and the piston and the expansible cylinder are such that it will be located at the central axis of the cylinder and tank for maximum compacting pressure. A driving wheeled suspension system is attached to the rearward part of the tank while driven steering control wheels and connected suspension system are attached to a forward part of the tank. A prime mover (engine) and power transmission means are attached to the underneath side of the tank and interconnected by a drive shaft with the driving wheels. An operator's cab is attached to the forward end of load receiving tank and includes the usual means to control the movement and operation of the vehicle and the load handling system.

In a preferred embodiment, the load receiving opening is located top-front of the tank and the closure is pivoted along the rearward side of the opening. A tailgate closes the rear end of the tank by a hinge at the top of the tank, hydraulic piston and cylinder means cooperate to open and close the tailgate along with a hydraulic piston and cylinder means to releasably engage and lock the tailgate at the bottom in its closed position.

A front loader mechanism includes parallel spaced guide tracks which extend forwardly and arcuately rearwardly upward of the cab and to the load receiving tank. A connecting arm is associated with each track for movement therealong utilizing guide rollers at the bottom end of each of the connecting arms. The top end of each connecting arm is pivotally attached to the forward end of the closure for the top front opening. A pair of load pick-up receiving arms are pivotally attached to the connecting arm. A hydraulic power (piston and cylinder) system will pivot said arms pick-up to receive a load container by the forward movement of the vehicle. A separate hydraulic power means pivots or moves the closure between its closed and open position. The movement of the closure causes the load to be simultaneously raised as the closure is moved to the open and dump position. The reverse movement will return the empty load container back to the ground.

The chassiless vehicle is also adaptable to be used with a rear loader or side loader concept.

DETAILED DESCRIPTION OF THE PREFERRED EMBODIMENT

Before explaining the present invention, in detail, it is to be understood that the invention is not limited in its application to the details of construction and arrangement of parts illustrated in the accompanied drawings, since the invention is capable of other embodiment and being practiced or carried out in a variety of ways. Also, it is to be understood that the phraseology or terminology employed herein is for the purpose for description and not of limitation.

Referring now to FIGS. 1, 2, 3 and 4, the vehicle of this invention comprises a load receiving tank 10 which becomes integrated as the main structural framework of the vehicle in lieu of a normal chassis. The tank is supported upon a driving wheel suspension system generally designated by the numeral 12 and a forward driven wheel suspension system generally designated by the numeral 14. A prime mover 16 is attached to the underneath side of the tank 10 and includes a typical power transmission 18 which is interconnected by a drive shaft 20 to power the driving wheel suspension system 12. An operator's control cab 22 is provided and attached to the forward end of tank 10, the cab having typical means to control the operation of the vehicle and the load receiving and dumping system, generally designated by the numeral 24. In this invention the load system 24 is integrated with the tank load receiving opening and closure system generally designated by the numeral 26. The loader mechanism comprises load receiving arms 30 and 32 (FIG. 2) which are attached to shaft 34 which in turn is pivotally mounted to respective connecting arms 36 and 38, these arms are pivotally attached at 40 and 42 to the front edge of closure 44 of the opening to the top of tank 10. The closure 44 is hinged along the rearward edge by pivot members 46, 48 and 50. The connecting arms 36 and 38 include respectively at their lower ends guide rollers 60 and 62 on one side and 64 and 66 on the other side which act as guides for travel upon respective fixed tracks 70 and 72, which extends forwardly and upward in a rearward direction as shown.

Figure 1:
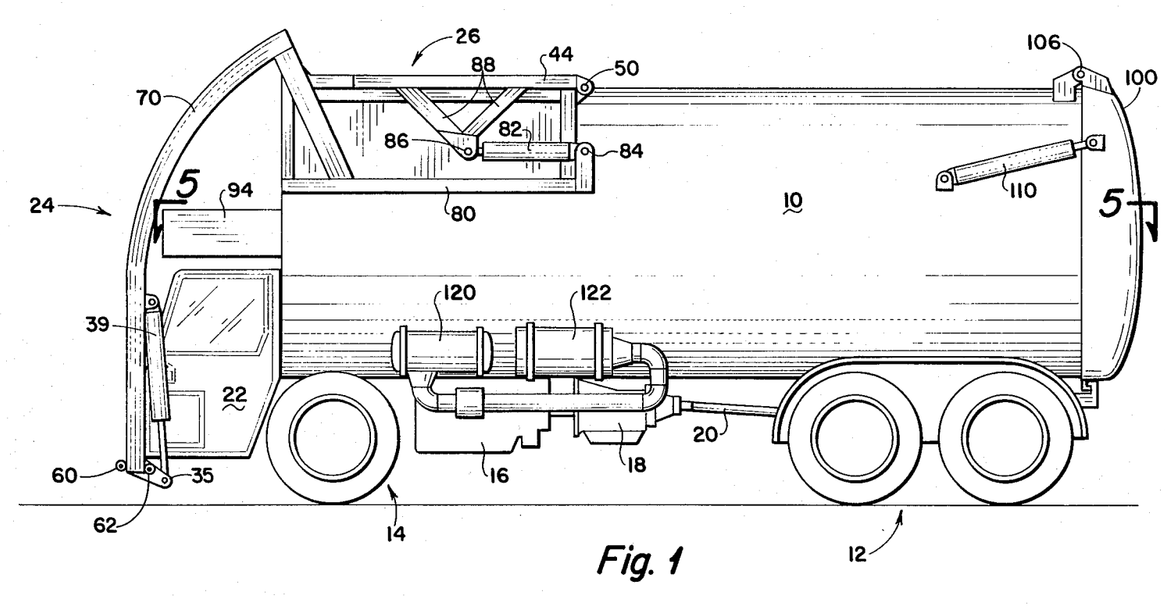
FIG. 1 is a side elevational view of the vehicle of this invention.
Figure 2:
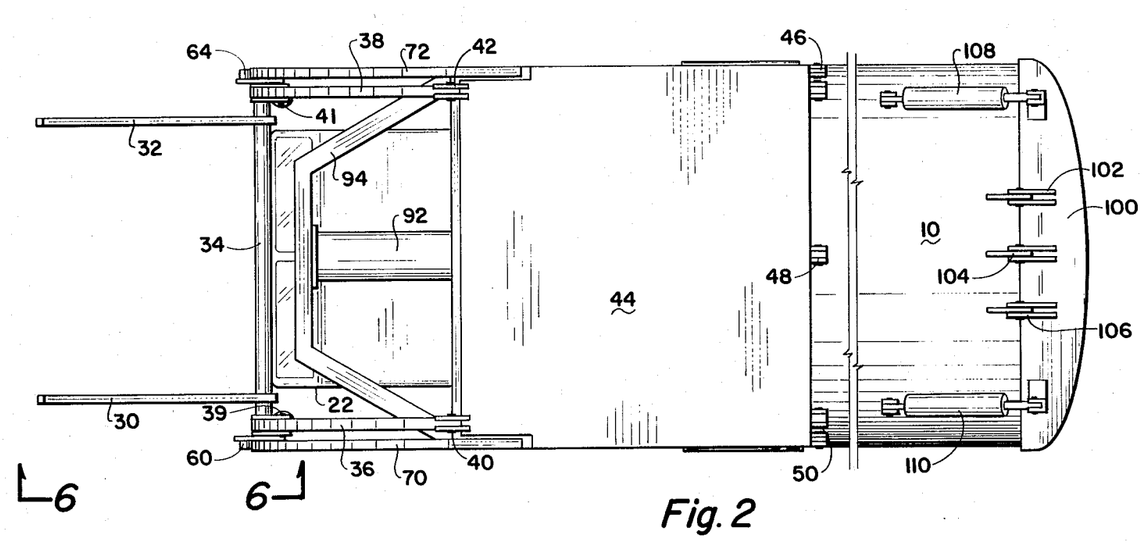
FIG. 2 is a top elevational view, partly cut-away.
Figure 3:
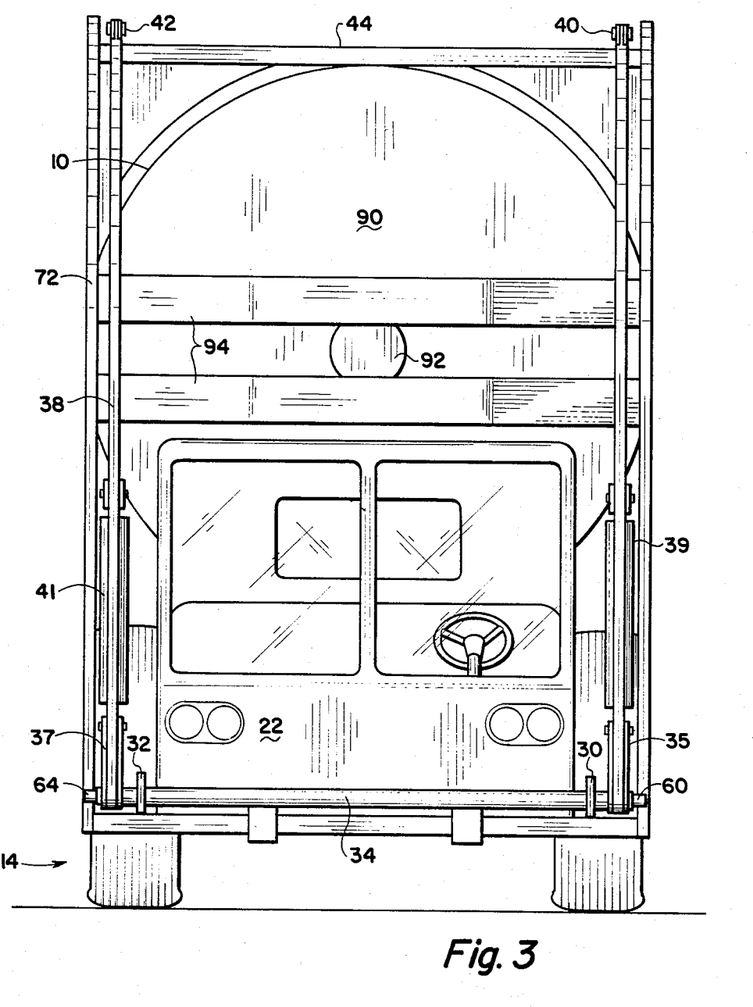
FIG. 3 is a front elevational view of the vehicle of this invention.
Figure 4:
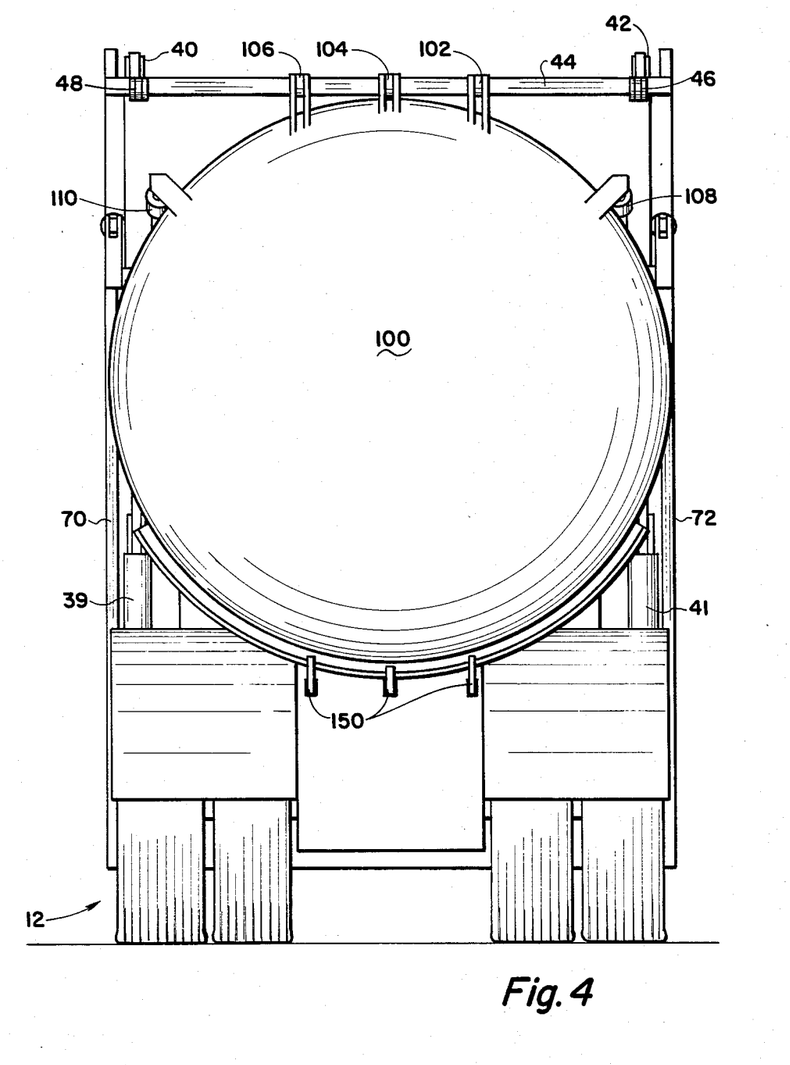
FIG. 4 is a rear elevational view.

A pair of crank arms 35 are attached to shaft 34 straddling connecting arm 36 on one side and crank arms 37 straddling connecting arm 38 on the other side. Respective hydraulic power supplies 39 and 41 act to pivot the lift arms 30 and 32 from the position such as shown in FIG. 2 for attachment with a pick-up load container to a vertical position for road travel.

The tank closure 44 is supported on tank 10 by a framework 80. A hydraulic power supply 82, on each side, is attached to frame 80 at pivot 84 while the piston end is pivotally attached at 86 to a framework 88 formed as a part of the closure 44, the operation of which will be hereinafter described.

Figures 5, 6, 7:
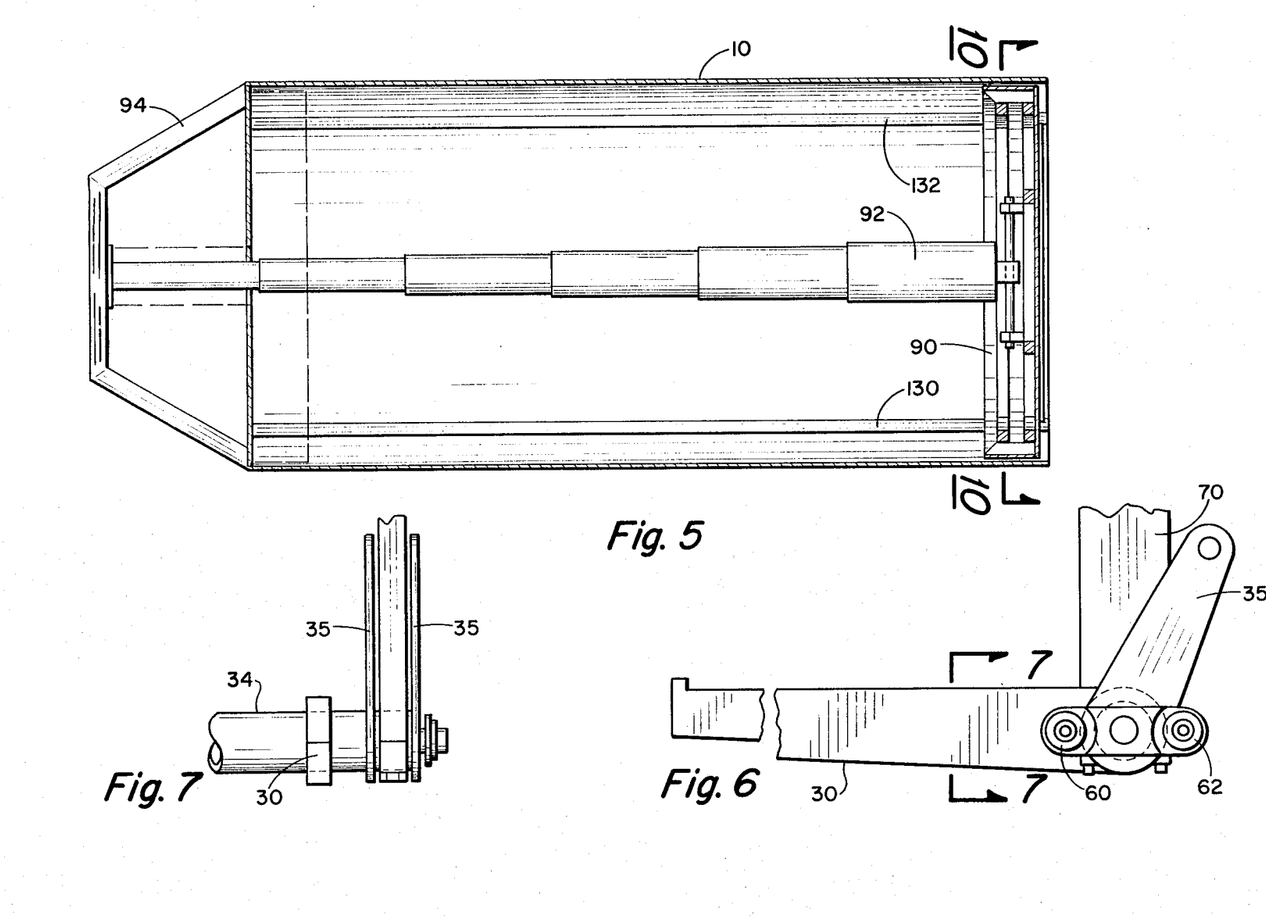
FIG. 5 is a sectional view taken along the lines 5—5 of FIG. 1 showing the packer piston extended.
FIG. 6 is a partial view of the load receiving mechanism.
FIG. 7 is a partial sectional view taken along lines 7—7 of FIG. 6.

Internally of tank 10 is a packer piston 90 which is reciprocably movable from its normal position in the front of tank 10 to a rearward position such as shown in FIG. 5 for either compacting the load or for dumping the load from the tank 10. The movement of the piston is caused by a telescopic hydraulic expansible cylinder means 92 which is nested above the operator cab 22 and forward of tank 10 being supported by a frame 94 at the forward end of the tank. The horizontal location of the hydraulic power in the center of the packer piston increases the compaction force. A tailgate 100 is used to close the rearward end of tank 10 being hinged at the top by pivotal hinge members 102, 104 and 106. Hydraulic power supplies 108 and 110 are adapted to open and close the tailgate 100, which is more aptly described in detail with reference to FIG. 11. One or more locking power actuated levers 150 cooperate with a locking lip on the tailgate 100 to maintain the closed position.

The prime mover 16 includes other necessary equipment such as an air cleaner 120, an exhaust actuated turbo system 122 as is known in the art.

Figure 8:
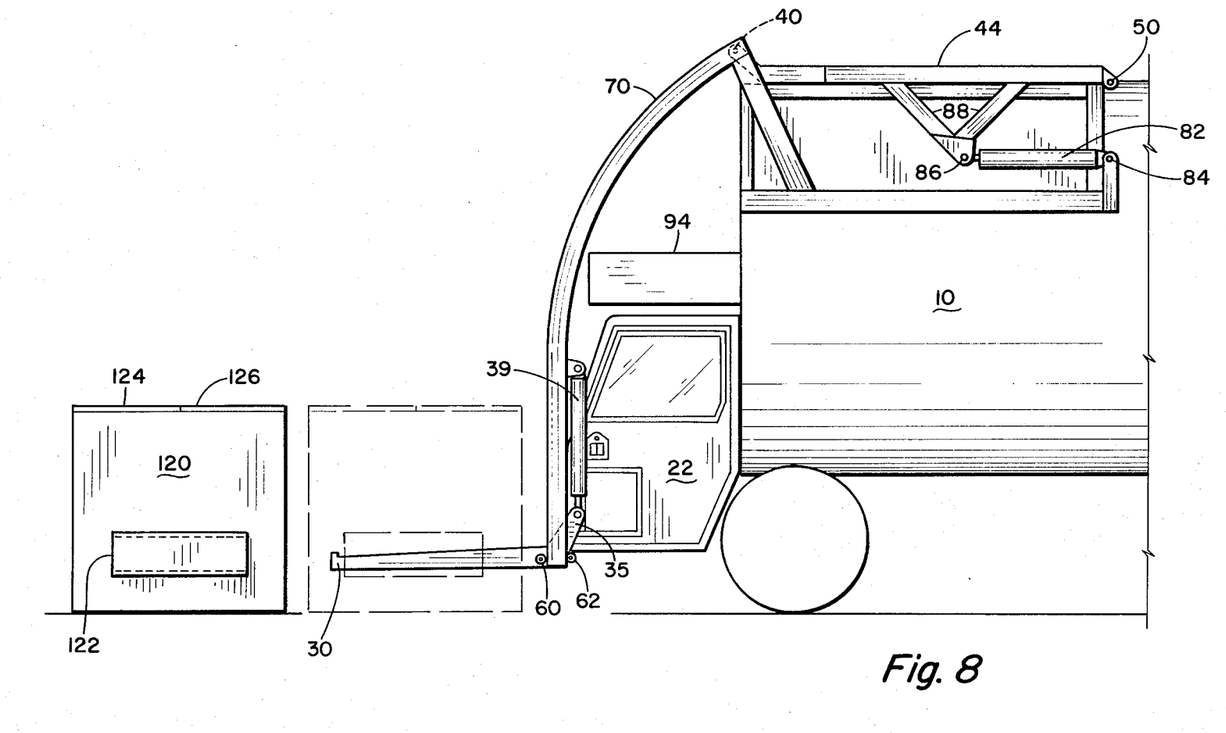
FIGS. 8 and 9 are partial views describing the load receiving and dumping procedure.
Figure 9:
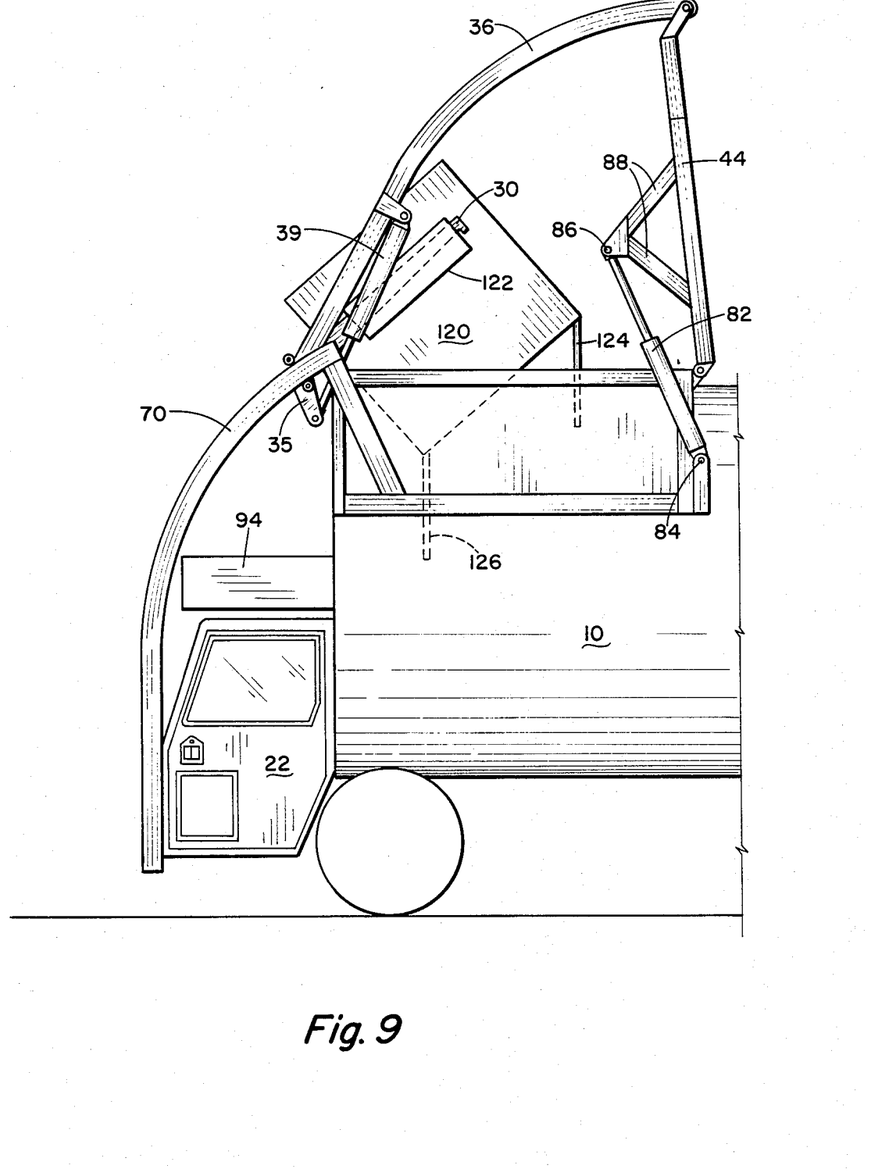

Referring now to FIGS. 8 and 9, the front loader system of this invention is described when used relative to a pick-up type load container 120 positioned on the ground. The container includes housed openings 122 on each side thereof to receive the respective arms 30 and 32 of the load system. Doors 124 and 126 are hingeably supported on top of the container 120. The operator of the vehicle pivots the receiving arms 30 and 32 to a horizontal position capable of being inserted within the openings 122. The vehicle is then moved forward inserting arms 30 and 32 into openings 122. Hydraulic power cylinders 82 are then actuated. The actuation causes the pivoting of closure 44 and simultaneously raises connecting arms 36 and 38 and attached container 120 upwardly until a position such as shown in FIG. 9 is reached. Hydraulic cylinders 39 and 41 are then actuated to pivot the receiving arms 30 and 32 and thus dump the contents of pick-up load container 120 as shown into the opening at the top of tank 10. Thereafter the hydraulic cylinders 39 and 41 are actuated to return the receiving arms and container 120 back to its raising position and by retracting power cylinders 82 the procedure is reversed until the container 120 is positioned on the ground. The operator then reverses the vehicle to remove the receiving arms 30 and 32 therefrom. The receiving arms are then retracted by operation of power cylinder 39 to a position for highway travel of the vehicle, where the process is then repeated at the next load pick-up station.

Figure 10:
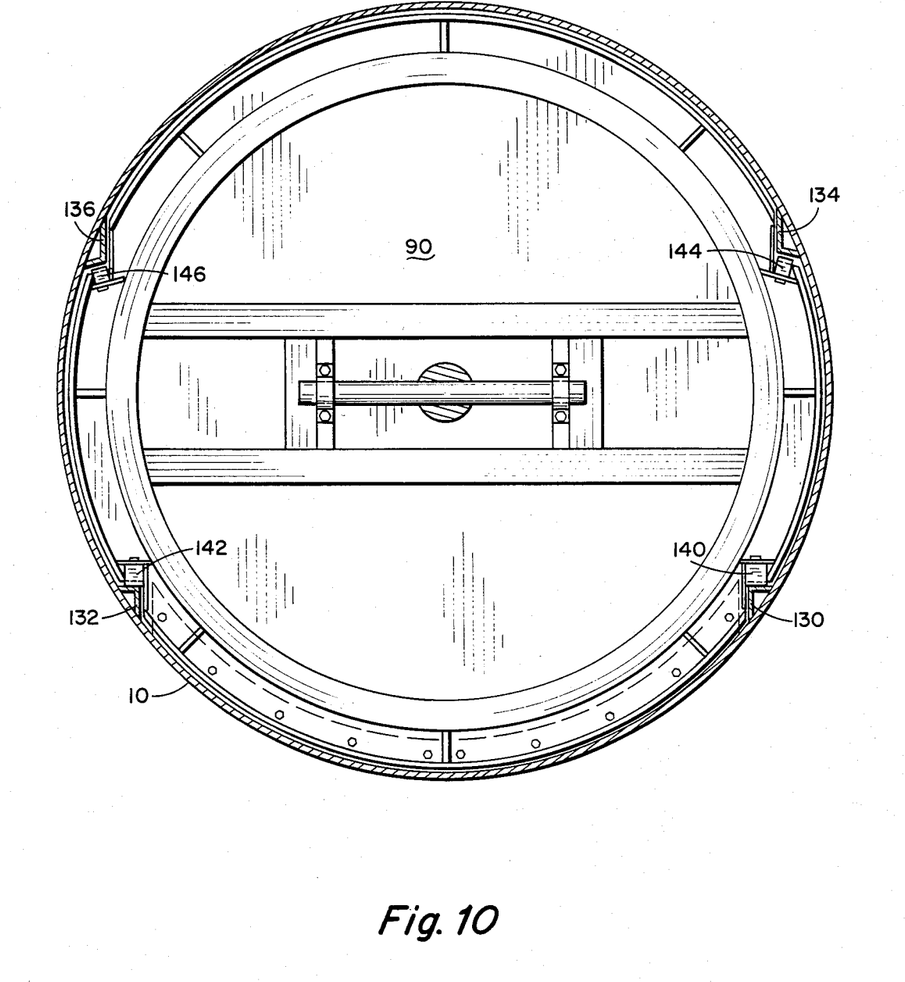
FIG. 10 is a sectional view taken along lines 10—10 of FIG. 5.

The compaction of the load occurs by the rearward movement of piston packer 90 which is more particularly described in FIG. 10. In that view, the tank shell 10 includes longitudinal piston support rail members 130, 132, 134 and 136 which operate in conjunction with respective guide rollers 140, 142, 144 and 146 for the smooth reciprocation of the pistons 90 within the cylinder tank 10.

Figure 11:
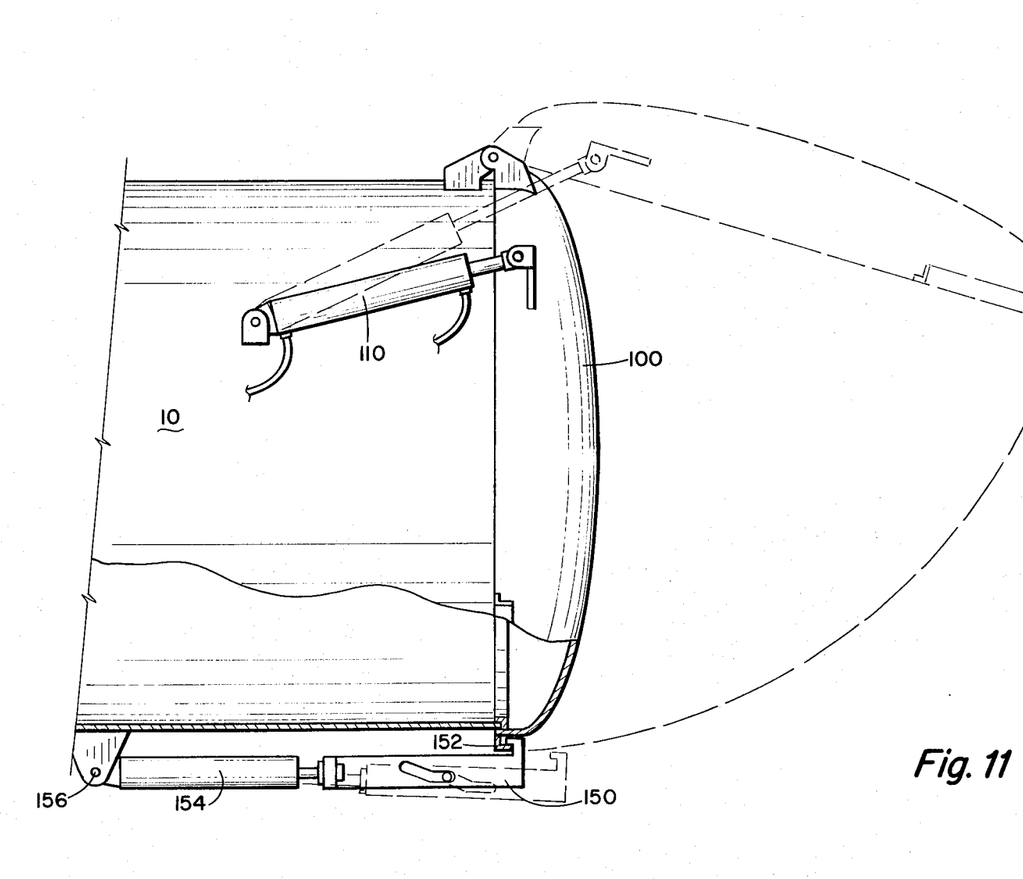
FIG. 11 is a partial side elevational view describing the tailgate assembly.

Once the tank 10 has been filled to its capacity and it is desired to dump the load at a given location, tailgate 100 is opened, first by retracting the locking power levers 150 from the locking lip 152 formed as a part of the periphery of the tailgate 100. The power for the system occurs by one or more hydraulic cylinders 154 pivotally attached at 156 to the tank 10. The piston is attached to the locking lever 150. With the door open by the actuation of hydraulic power cylinders 108 and 110 as shown in FIG. 11 the piston packer 90 is then operated by its telescopic hydraulic piston 92 to force the material out the rearward end of tank 10.

Figure 12:
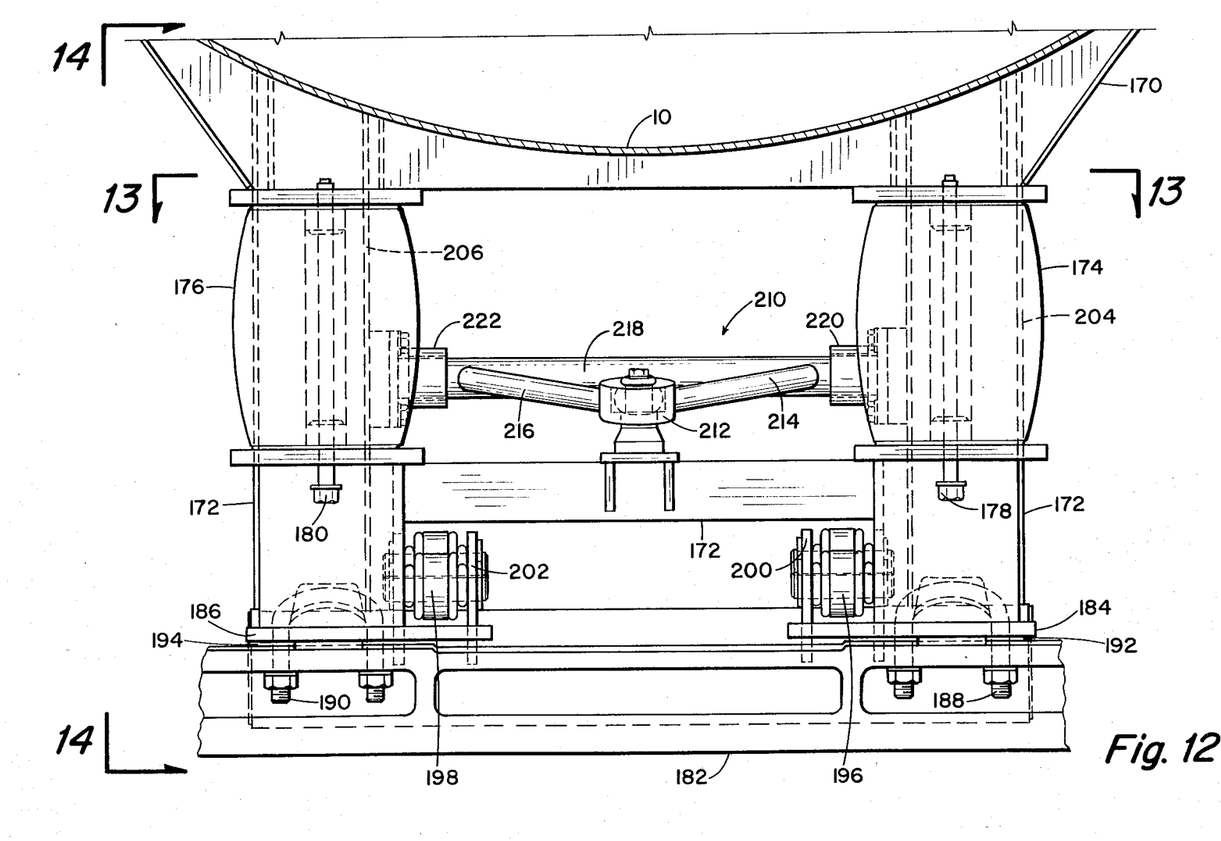
FIG. 12 is a front elevational view of the front suspension system.
Figure 13:
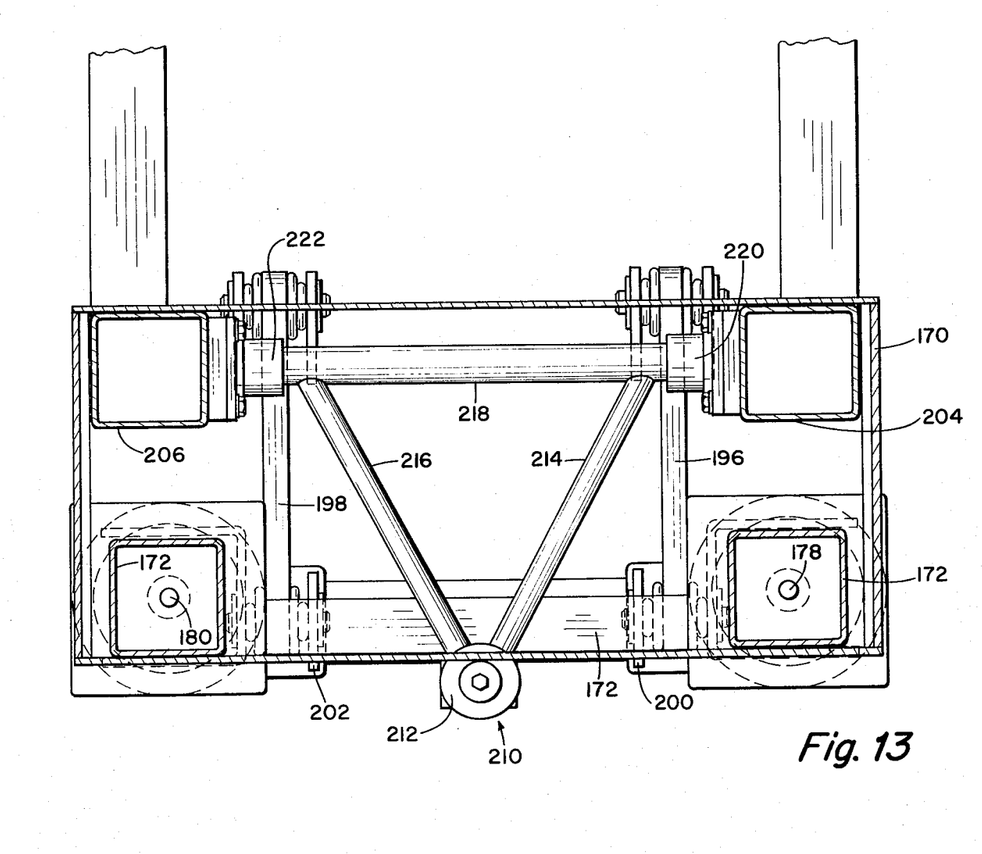
FIG. 13 is a sectional view taken along the lines 13—13 of FIG. 12.
Figure 14:
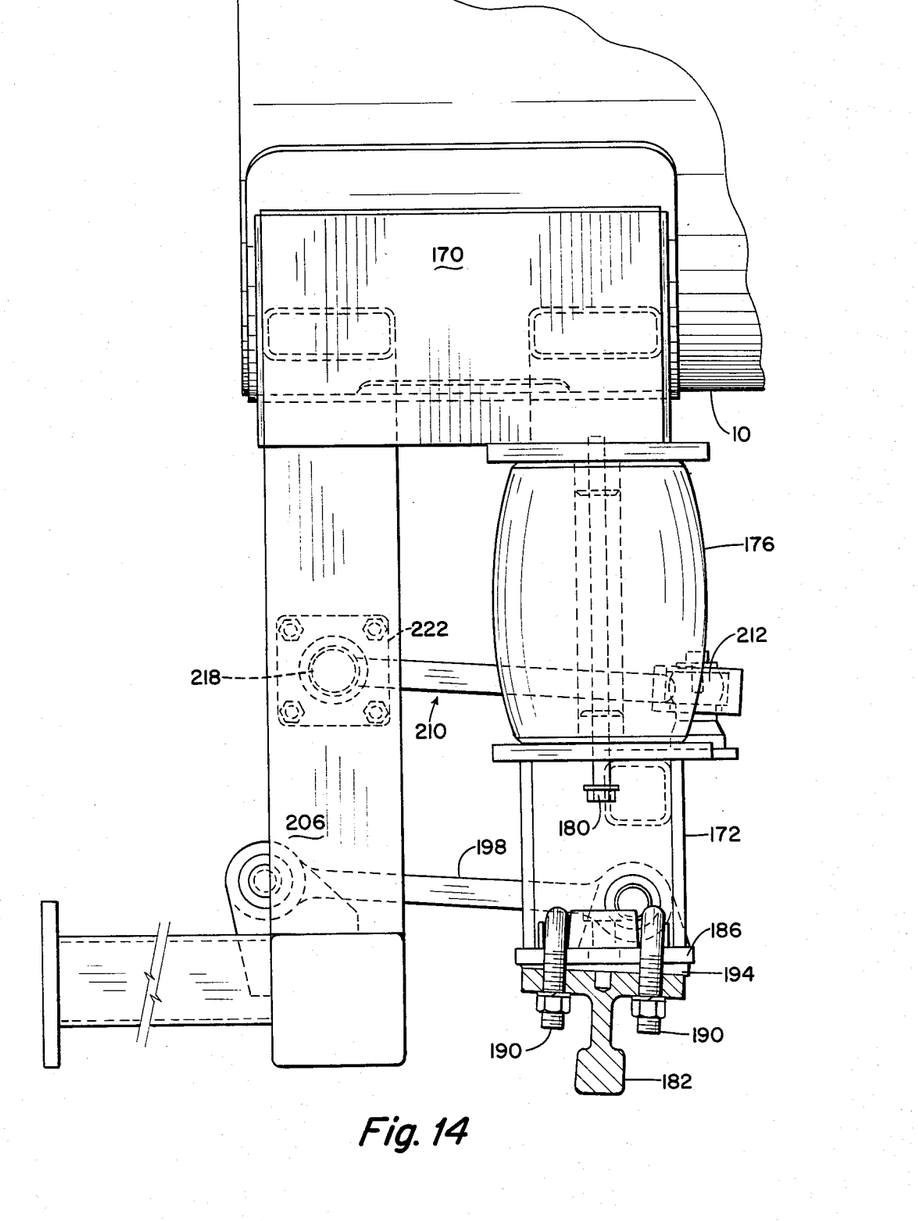
FIG. 14 is a sectional view taken along the lines 14—14 of FIG. 12.

The rear driving suspension system 12 of the invention is one which is typically utilized in the art. The forward driven suspension system and steering system is described by reference to FIGS. 12, 13 and 14. Suspension mounting bracket 170 is attached to tank 10. Therebelow is axle mounting frame 172 supported by rubber springs 174 and 176 retained by bolts 178 and 180. Front axle 182 is interconnected to each side of axle mounting frame 172 by spring pads 184 and 186 by pairs of U-bolts 188 and 190. Sandwiched therebetween are respective spring pads 192 and 194. The rods 196 and 198 are pivotally connected to mounting frame 172 brackets 200 and 202 and extend rearwardly to retainer brackets 204 and 206 which depend from tank suspension bracket 170. A swing arm support generally designated by the numeral 210 includes a pivot arm mounting with a spherical bearing 212. V-shaped arms 214 and 216 which connect with horizontal arm 218 pivotally connected at 220 and 222 to respective retainer brackets 200 and 204. Not shown are typical wheel mountings at the ends of front axle and typical steering control linkage as known in the art. The suspension system of this invention permits a 'softer' ride quality when empty as opposed to a standard metal spring suspension which creates a softer ride when loaded. The springs 174 and 176 provide a variable rate that will maintain a natural frequency between 120 $H_z$ and 150 $H_z$. Thus an increase in load does not give a proportional increase in deflection and acceleration.

Figure 15:
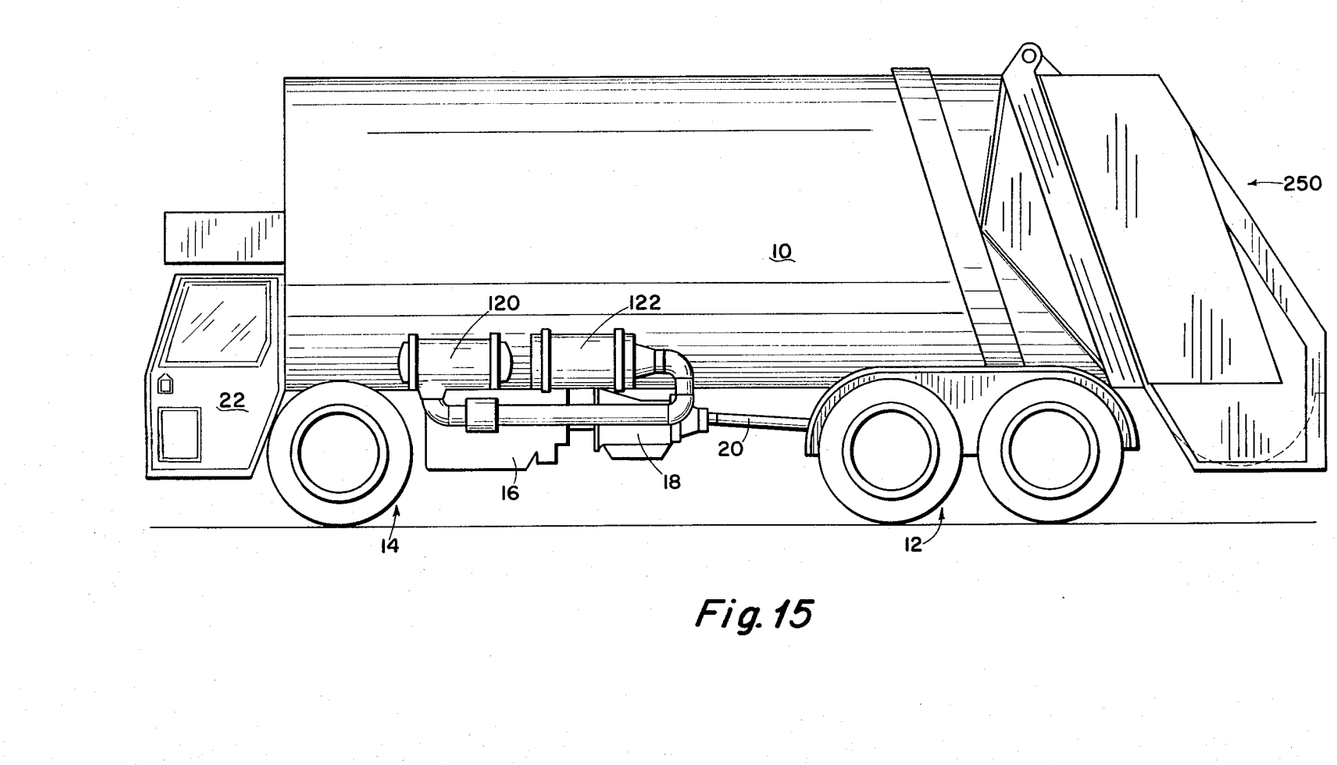
FIG. 15 is a side elevational view of the vehicle of this invention with a rear type refuse loader.

FIG. 15 describes a modification for use with a rear loader generally designated by the numeral 250. The rear of the tank will have a transition to a square or rectangular shape to accomodate any number of standard and known rear compaction hoppers such as sold under the trademarks Dempster or Heil (Formula 5000). These hoppers receive and will compact the refuse in the tank 10. Raising the hopper opens the tank and the compacting piston 90 will unload the stored refuse at the dump site. Typical of such rear loader hoppers is found in U.S. Pat. No. 2,798,624.

The invention is adaptable to a side loader opening as shown in U.S. Pat. Nos. 3,955,694 and 4,057,154.

Other modifications within the scope of the invention include a sliding door closure for the tank load receiving opening in lieu of a pivoting door as shown. Also, the design of tracks 70 and 72 can include a cam-like surface which will tilt the pick-up container automatically with out the need of actuating hydraulic power systems 39 and 41. Also it is understood that pneumatic power systems could be used instead of hydraulic, as described.

What is claimed is:

1. A self-propelled wheeled load handling vehicle comprising:
   a load receiving tank directly supported upon a spaced driving wheel suspension system and a driven wheel suspension system;
   a prime mover means and power transmission means attached to said tank between said suspension systems to interconnect said prime mover power to said driving wheels;
   a fluid power source;
   an operator's cab attached to a forward end of said tank, said cab having means to control the operation of said vehicle and said fluid power source;
   said load receiving tank having a top front load receiving opening and a closure therefor, said closure pivotally supported to the top of said tank about an axis that is substantially transverse to the longitudinal forward/rearward axis of said tank, said pivot located at the rear of said opening;
   first fluid power cylinder/piston means attached between said tank and said closure to pivot said closure from a horizontal closed position to a substantially vertical position;
   a compacting packer piston reciprocable inside said tank from front to rear and vice-versa;
   a tailgate of substantially the cross-sectional size of said tank and hingably connected to the rear end of said tank;
   front loader means to temporarily attach with a pick-up load container positioned on the ground, raise and dump same into said load receiving opening and return said container to the ground, said front loader means comprising vertically parallel guide tracks extending forwardly and upwardly of said operator's cab toward said top front of said opening, a connecting arm having guide means for travel on each of said guide tracks, load receiving arm means pivotally attached to the lower end of each said connecting arm, a second fluid power cylinder/piston means to pivot said load receiving arm means in a vertical plane, and means to pivotally interconnect the upper end of each said connecting arm with said closure means.

2. The vehicle of claim 1 wherein said tailgate is hinged at the top of said tank, third fluid power cylinder/piston means between said tank and said tailgate to open and close same.

3. The vehicle of claim 2 including a fourth fluid power cylinder/piston means to releasably engage and lock said tailgate at the bottom of said tank.

4. The vehicle of claim 1 wherein the top of said cab is substantially below the top of said tank and including a telescopic fluid power expansible cylinder, a movable end of which is attached to said packer piston, and a fixed end of which is supported by a frame located forward of said tank above said operator's cab.

5. The vehicle of claim 4 wherein said fixed end is located a distance substantially equal to the length of said expansible cylinder in its retracted position.

6. The vehicle of claim 4 wherein said cylinder is substantially horizontally oriented and substantially central of said packer piston.

7. The vehicle of claim 6 wherein said fixed end is located a distance substantially equal to the length of said expansible cylinder in its retracted position.

8. The vehicle of claims 1, 2 and 4 wherein said suspension systems comprise a mounting bracket attached to said vehicle; a pair of parallel spaced rubber springs depending from said mounting bracket; an axle mounting frame depending from the bottom of said springs, means to attach said axle to the bottom of said axle mounting frame; a pair of retainer brackets attached to said mounting bracket and depending essentially parallel to the depending axis of said springs; parallel tie rods interconnected to said axle mounting frame and said retainer bracket; a swing arm support attached at one end to a pivotal mounting on said axle mounting frame and to said retainer bracket at the other end; and wheel and bearing means attached to each end of said axle.

9. A self-propelled wheeled load handling vehicle comprising;
   a cylindrical load receiving tank directly supported upon a spaced driving wheel suspension system and a driven wheel suspension system;
   a prime mover means and power transmission means attached to said tank between said suspension systems to interconnect said prime mover power to said driving wheels;
   a fluid power source;
   an operator's cab attached to a forward end of said tank, the top of said cab being substantially below the top of said tank, said cab having means to control the operation of said vehicle and said fluid power source;
   said load receiving tank having a top front load receiving opening and a closure therefor, said closure pivotally supported to the top of said tank about an axis that is substantially transverse to the longitudinal forward/rearward axis of said tank, said pivot located at the rear of said opening;
   first fluid power cylinder/piston means attached between said tank and said closure to pivot said closure from a horizontal closed position to a substantially vertical position;
   a compacting packer piston reciprocable inside said tank from front to rear and vice-versa;
   a telescopic fluid power expansible cylinder, a movable end of which is attached to said packer piston, and a fixed end of which is supported by a frame located forward of said tank above said operator's cab;
   a tailgate of substantially the cross-sectional size of said tank and hingable connected to the rear end of said tank;
   front loader means to temporarily attach with a pick-up load container positioned on the ground in front of said operator's cab, said loader means interconnected to said closure means to raise and dump same into said load receiving opening and return said container to its original position on the ground.

10. The vehicle of claim 9 wherein said tailgate is hinged at the top of said tank, second fluid power cylinder/piston means between said tank and said tailgate to open and close same.

11. The vehicle of claim 10 including a third fluid power cylinder/piston means to releasably engage and lock said tailgate at the bottom of said tank.

12. The vehicle of claim 9 wherein said fixed end is located a distance substantially equal to the length of said expansible cylinder in its retracted position.

13. The vehicle of claim 9 wherein said cylinder is substantially horizontally oriented and substantially centrally of said packer piston.

14. The vehicle of claim 13 wherein said fixed end is located a distance substantially equal to the length of said expansible cylinder in its retracted position.

15. The vehicle of claim 9 wherein said suspension systems comprise a mounting bracket attached to said vehicle; a pair of parallel spaced rubber springs depending from said mounting bracket; an axle mounting frame depending from the bottom of said springs, means to attach said axle to the bottom of said axle mounting frame; a pair of retainer brackets attached to said mounting bracket and depending essentially parallel to the depending axis of said springs; parallel tie rods interconnected to said axle mounting frame and said retainer bracket; a swing arm support attached at one end to a pivotal mounting on said axle mounting frame and to said retainer bracket at the other end; and wheel and bearing means attached to each end of said axle.

* * * * *